US009198496B2

(12) United States Patent
Shintani

(10) Patent No.: US 9,198,496 B2
(45) Date of Patent: Dec. 1, 2015

(54) MAKEUP TV

(75) Inventor: Peter Shintani, San Diego, CA (US)

(73) Assignee: Sony Corporation, Tokyo (JP)

( * ) Notice: Subject to any disclaimer, the term of this patent is extended or adjusted under 35 U.S.C. 154(b) by 269 days.

(21) Appl. No.: 13/539,932

(22) Filed: Jul. 2, 2012

(65) Prior Publication Data

US 2014/0002628 A1  Jan. 2, 2014

(51) Int. Cl.
H04N 7/18 (2006.01)
A45D 44/00 (2006.01)
A45D 42/10 (2006.01)
H04N 1/387 (2006.01)
H04N 1/60 (2006.01)
H04N 9/73 (2006.01)

(52) U.S. Cl.
CPC .............. *A45D 44/005* (2013.01); *A45D 42/10* (2013.01); *H04N 1/3871* (2013.01); *H04N 1/6077* (2013.01); *H04N 9/73* (2013.01)

(58) Field of Classification Search
CPC ....................................... H04N 7/18
USPC ............................................ 348/77
See application file for complete search history.

(56) References Cited

U.S. PATENT DOCUMENTS

| 6,343,147 | B2* | 1/2002 | Yamamoto ..................... 382/167 |
| 2005/0259158 | A1* | 11/2005 | Jacob et al. ................. 348/218.1 |
| 2006/0109342 | A1 | 5/2006 | Bazin |
| 2007/0046826 | A1* | 3/2007 | Bellis et al. .................... 348/656 |
| 2009/0061913 | A1 | 3/2009 | Woodruff |
| 2011/0254940 | A1* | 10/2011 | Suzukawa et al. ............... 348/77 |

FOREIGN PATENT DOCUMENTS

CN  102149010  8/2011
JP  20080277983  11/2008

OTHER PUBLICATIONS

Eriko Iwabuchi, Maki Nakagawa, ITIRO SIIO; "Smart Makeup Mirror: Computer-Augmented Mirror to Aid Makeup Application", J.A. Jako: human-Computer Interaction, Part IV, HCII 2009, LNCS 5613, pp. 495-503, 2009.

* cited by examiner

*Primary Examiner* — Sath V Perungavoor
*Assistant Examiner* — Jeffery Williams
(74) *Attorney, Agent, or Firm* — John L. Rogitz

(57) ABSTRACT

A TV has a makeup mode in which a camera on the TV images a viewer of the TV and presents the viewer's image on the TV. To illuminate the viewer, the TV also juxtaposes with the viewer's image an all-white background image having a known color temperature and brightness.

20 Claims, 3 Drawing Sheets

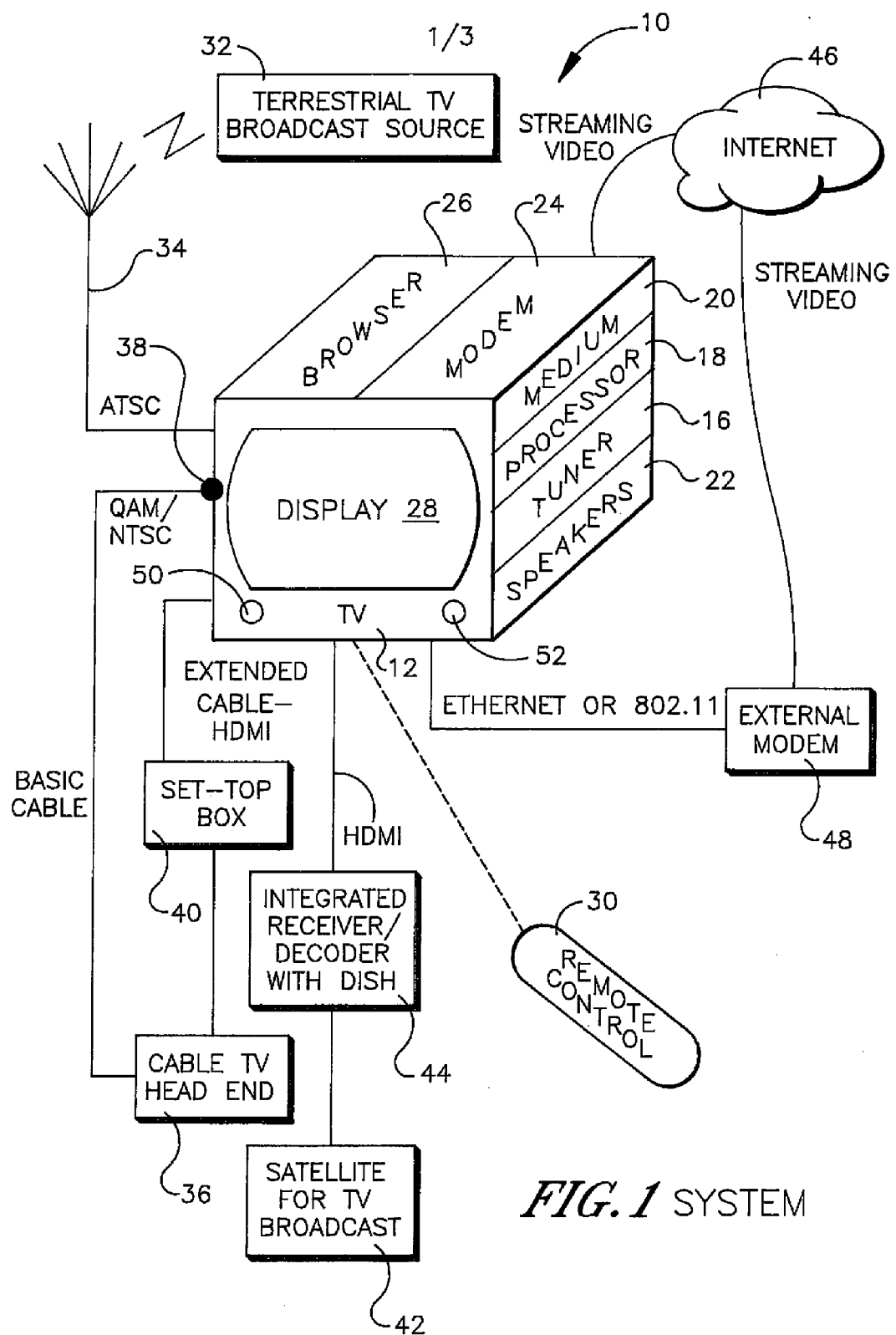
FIG. 1 SYSTEM

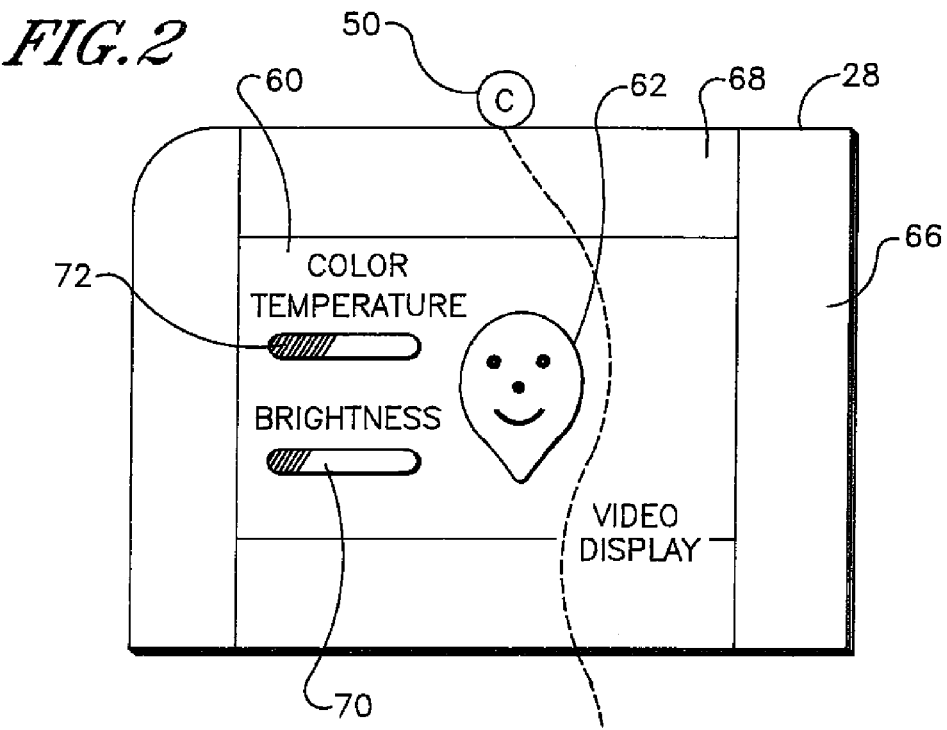
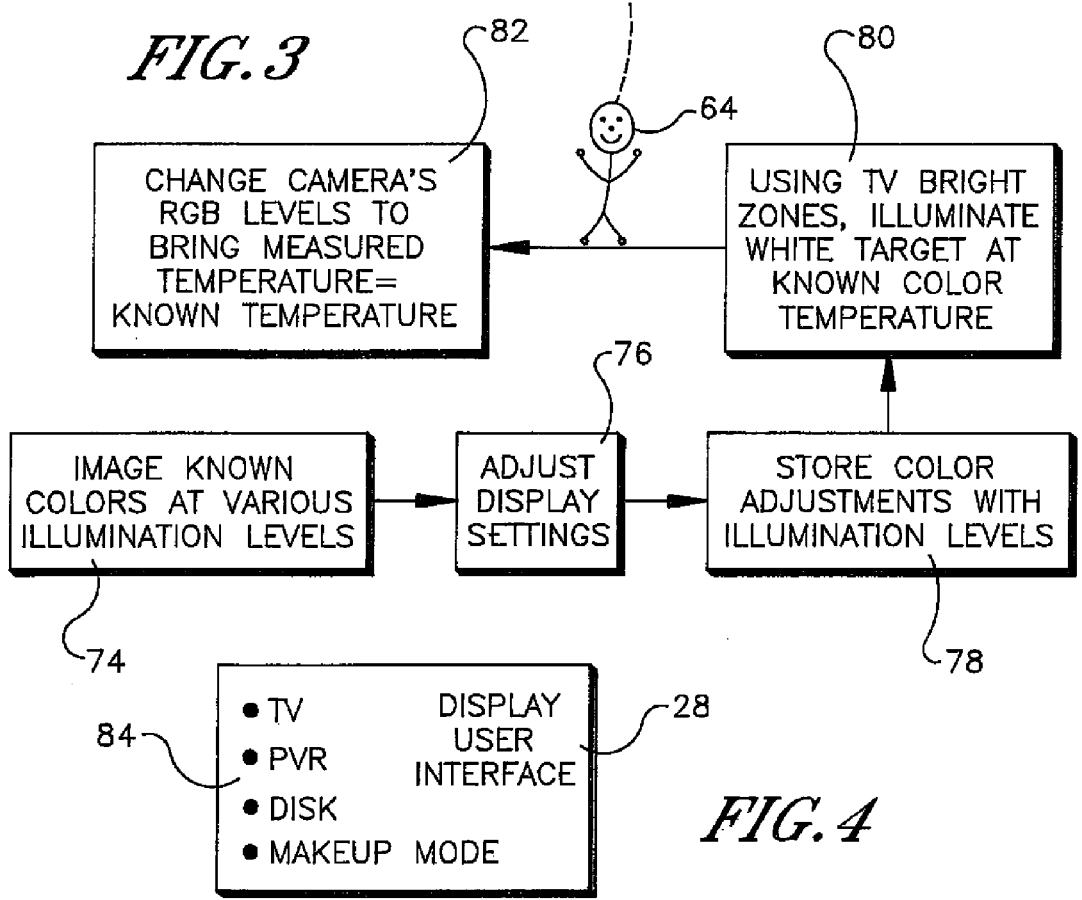

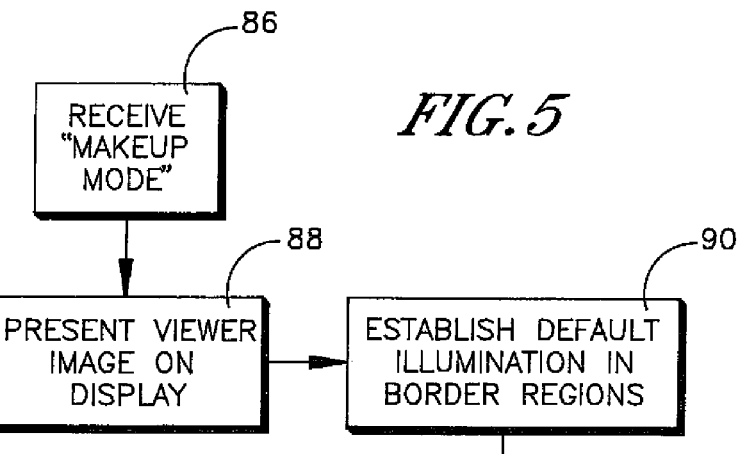
FIG. 5
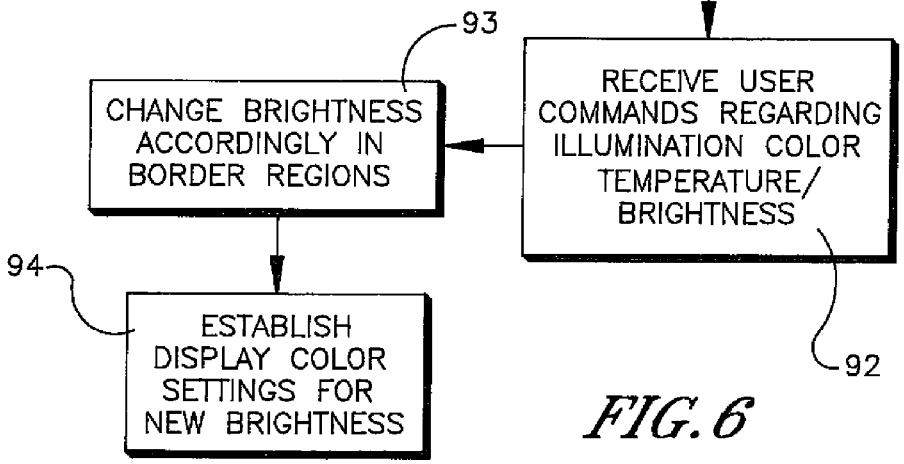
FIG. 6
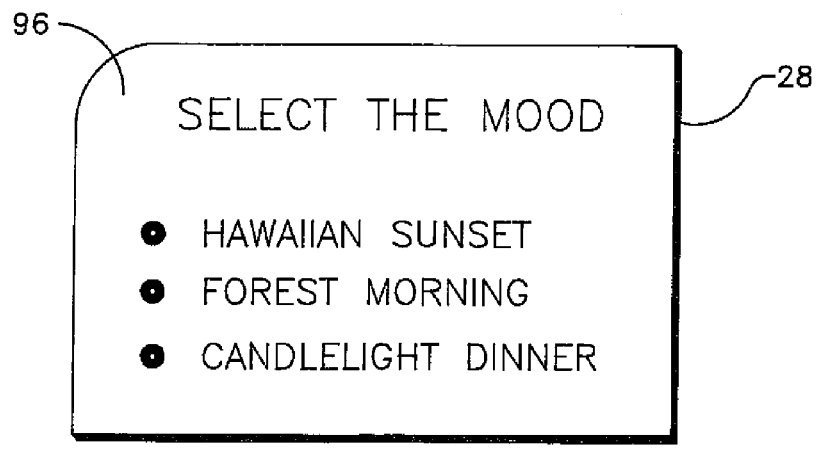

MAKEUP TV

FIELD OF THE INVENTION

The present application relates generally to TVs that can be used as makeup mirrors.

BACKGROUND OF THE INVENTION

Ambient lightning in the area of a mirror being used for the application of make up or other cosmetics may not be of the correct color temperature or sufficiently constant color temperature for critical evaluation during application. The result is that the person's judgment regarding how the makeup will look once away from the mirror may be clouded by varying color and/or hue conditions at the mirror. To correct color temperature, crude filters or lamps have been provided on some makeup mirrors.

SUMMARY OF THE INVENTION

As understood herein, large video displays are capable of outputting a considerable amount of light that can be metered precisely, and this recognition can be leveraged into providing a video makeup display that overcomes the shortcomings of conventional makeup mirrors.

Accordingly, an audio video display device (AVDD) includes a processor and a video display presenting demanded images under control of the processor. A camera communicates images of objects in front of the display to the processor. A computer readable storage medium bearing instructions is executable by the processor to receive from the camera an image of a viewer of the display. The processor presents the image of the viewer in a picture region of the display, and also presents a white background image and no other images in at least one border region adjacent the picture region to illuminate the viewer.

In one example, the processor establishes first and second border regions straddling the picture region. Each border region presents a white background image and no other images. The border regions can be adjacent left and right sides of the picture region and/or adjacent top and bottom sides of the picture region.

The white background image has a predetermined color temperature. It may also have a predetermined brightness. The processor can cause the display to present a user interface operable by a viewer to change the color temperature and/or brightness of the white background image.

In another aspect, a method includes imaging a view of an audio video display device (AVDD), presenting the image on the AVDD in real time as the viewer looks at the AVDD, and presenting an all-white background image on the display simultaneously with the image of the viewer to illuminate the viewer.

In another aspect, a TV includes a display, a camera communicating at least one image of a viewer, and a processor receiving the image from the camera. The image is presented on the display. The processor controls the TV to cause the TV to enter a makeup mode in which the camera images a viewer of the TV and the viewer's image is presented on the TV. To illuminate the viewer, the processor juxtaposes with the image an all-white background image having a known color temperature and brightness.

The details of the present invention, both as to its structure and operation, can be best understood in reference to the accompanying drawings, in which like reference numerals refer to like parts, and in which:

BRIEF DESCRIPTION OF THE DRAWINGS

FIG. 1 is a block diagram of a non-limiting example system in accordance with present principles;

FIG. 2 is a screen shot of the display presenting an image of a viewer in a picture region bounded by border regions;

FIG. 3 is a flow chart of example calibration logic;

FIG. 4 is a screen shot of an example user interface for invoking makeup mode;

FIG. 5 is a flow chart of example logic for executing makeup mode; and

FIG. 6 is an example screen shot of a mood select user interface for allowing a viewer to establish the color temperature of the border regions.

DETAILED DESCRIPTION OF THE PREFERRED EMBODIMENT

Referring initially to the non-limiting example embodiment shown in FIG. 1, a system 10 includes an audio video display device (AVDD) 12 such as a TV including a TV tuner 16 communicating with a TV processor 18 accessing a tangible computer readable storage medium 20 such as disk-based or solid state storage. The AVDD 12 can output audio on one or more speakers 22. The AVDD 12 can receive streaming video from the Internet using a built-in wired or wireless modem 24 communicating with the processor 12 which may execute a software-implemented browser 26. Video is presented under control of the TV processor 18 on a TV display 28 such as but not limited to a high definition TV (HDTV) flat panel display, and may be a touch screen display. The display 28 may be a 40" or larger display. User commands to the processor 18 may be wirelessly received from a remote control (RC) 30 using, e.g., rf or infrared. Audio-video display devices other than a TV may be used, e.g., smart phones, game consoles, personal digital organizers, notebook computers and other types of computers, etc.

TV programming from one or more terrestrial TV broadcast sources 32 as received by a terrestrial broadcast antenna 34 which communicates with the AVDD 12 may be presented on the display 28 and speakers 22. The terrestrial broadcast programming may conform to digital ATSC standards and may carry within it a terrestrial broadcast EPG, although the terrestrial broadcast EPG may be received from alternate sources, e.g., the Internet via Ethernet, or cable communication link, or satellite communication link.

TV programming from a cable TV head end 36 may also be received at the TV for presentation of TV signals on the display 28 and speakers 22. When basic cable only is desired, the cable from the wall typically carries TV signals in QAM or NTSC format and is plugged directly into the "F-type connector" 38 on the TV chassis in the U.S., although the connector used for this purpose in other countries may vary. In contrast, when the user has an extended cable subscription for instance, the signals from the head end 36 are typically sent through a STB 40 which may be separate from or integrated within the TV chassis but in any case which sends HDMI baseband signals to the TV. Other types of connections may be used, e.g., MOCA, USB, 1394 protocols, DLNA.

Similarly, HDMI baseband signals transmitted from a satellite source 42 of TV broadcast signals received by an integrated receiver/decoder (IRD) 44 associated with a home satellite dish may be input to the AVDD 12 for presentation on the display 28 and speakers 22. Also, streaming video may be received from the Internet 46 for presentation on the display 28 and speakers 22. The streaming video may be received at the computer modem 24 or it may be received at an in-home modem 48 that is external to the AVDD 12 and conveyed to the AVDD 12 over a wired or wireless Ethernet link and received at an RJ45 or 802.11x antenna on the TV chassis.

Also, in some embodiments a video camera 50, which may be integrated in the chassis if desired or mounted separately and electrically connected thereto, may be connected to the processor 16 to provide to the processor 16 video images of viewers looking at the display 28. The video camera 50 may be provided with a wide angle lens. The video camera 50 may have its own camera processor communicating with the TV processor 18, or it may be a simple imaging devices such as a CCD or other imager that is controlled by the processor 18. Furthermore, a microphone 52 may be provided on the chassis or separate therefrom and can be electrically connected to the processor 16 to provide viewer-generated voice commands to the processor 16.

Now referring to FIG. 2, a screen shot of the display 28 is shown in a makeup mode. As shown, a picture region 60 presents an image 62 of a viewer 64 of the AVDD as imaged by the camera 50. The image 62 may be presented on background wallpaper which may be, e.g., all white, although other colors, patterns, and even images such as TV video images may be presented underneath the image 62.

Also, at least one and preferably at least two border regions 66 frame the picture region 60. Thus, in the example shown the picture region 60 is central on the display 28 and is straddled by left and right border regions 66, although only a single border region need be provided as described above and that single border region may in fact simply underlay the image of the viewer. Alternatively or in addition to left and right border regions, top and bottom border regions 68 may also be provided adjacent the picture region 60.

According to present principles, each border region presents a white background image and no other images. That is, the border regions appear as white rectangles. It will readily be appreciated that the white border regions serve to illuminate the viewer 64. The white background presented in each border region is characterized by a brightness and a color temperature, e.g., 6500 degrees, 10,000 degrees, etc. (the higher the temperature, the "cooler" the color). These brightness and color temperature characteristics may be preset in the factory. Other characteristics may be used to define the white border regions. As understood herein, the appearance of paints, finishes, and cosmetics are greatly influenced by the color temperature of the ambient lightning. By using the excess light output capability of the border regions of the display 28 shown in FIG. 2, the display can provide light of a known color temperature for illumination of the viewer 64.

If desired, the viewer can be given a capability to change the brightness and color temperature characteristics using, e.g., slider tools 70, 72 that are presented on the display 28. The viewer can use, e.g., the RC 30 shown in FIG. 1 to click and drag the slider bars left and right across the screen to increase and decrease the brightness and/or color temperature as desired.

Furthermore, since the characteristics of the camera 50 are known or can be calibrated with reference color samples according to disclosure below, the system can account for the light given off by the image so that the effect of the illuminating border regions 66, 68 remains correct. Accordingly, at block 74 in FIG. 3 the display 28 is first calibrated by imaging known colors (with known color temperatures), preferably at known brightnesses, using, e.g., a so-called color "puck" according to video display calibration principles known in the art. The display settings are adjusted accordingly at block 76 and the color adjustments with, if desired, illumination (brightness) levels stored at block 78 in, e.g., the computer readable storage medium 20 shown in FIG. 1.

Proceeding to block 80, the AVDD is placed in the makeup mode to activate the one or more border regions 66, 68 of known color temperature (and if desired known brightness). A while target substrate is placed in front of the AVDD to be illuminated by the border regions and the camera 50 generates an output of the target substrate. This output indicates a color temperature (and if desired brightness) as imaged by the camera. The color temperature (and brightness) imaged by the camera are compared to the known color temperature (and brightness) that characterize the border regions and responsive to determining that a difference exists, the camera's red-green-blue (RGB) levels are adjusted at block 82 as necessary to make the color temperature (and brightness) of the image of the target substrate equal (if desired, within a predetermined tolerance) the know color temperature (and brightness) of the border regions 66, 68. Note that the above calibration may be performed in the factory prior to vending the AVDD and/or may be executed by a viewer following onscreen instructions and prompts that embody the description above.

FIG. 4 shows a user interface (UI) 84 that may be presented on the AVDD display 28 to enable a viewer to enter the above-described makeup mode. As shown, a "makeup mode" selector element may be provided in a list of other selector elements. Selection of the makeup mode selector element causes the AVDD to configure itself in the makeup mode described above.

Turning now to FIG. 5 for an example of makeup mode operation, responsive to receiving a makeup mode command at block 86, at block 88 when in the makeup mode an image of the viewer as imaged by the camera 50 is presented on the display 28. The preset white characteristics are established at block 90 in the border regions 66, 68, i.e., the border regions present only an all-white background of predetermined color temperature and if desired predetermined brightness.

In embodiments in which the viewer may establish the color temperature and/or brightness of the border regions, at block 92 the viewer's commands are received and applied at blocks 93 and 94 accordingly. While the onscreen sliders were discussed above as one mode for enabling a viewer to change color temperature and brightness, a UI 96 shown in FIG. 6 may be presented on the display 28 to allow a viewer to select a "package" of settings, i.e., a set of color temperature/brightness characteristics that approximate various ambient light descriptions. Thus, in the example shown, the viewer may wish for the border regions to assume a color temperature (and brightness) of a Hawaiian sunset, or a forest morning, or a candlelight dinner. Of course, different or additional ambient light descriptions can be used. In each case, the ambient color temperature (as reflected by, e.g., a white target substrate) and if desired brightness may be captured for each ambient light description by a camera having similar characteristics as the camera 50 and entered into a database in, e.g., the computer readable storage medium 20 during manufacture.

In one embodiment the camera 50 is associated with appropriate optics such that the viewer can stand or sit a comfortable distance in front of the display during makeup application. The camera 50 may be disposed in the center of the display 28 (behind the active surface), or the camera 50 may be mounted above or below the display, in which case, to image a viewer within a few feet of the display, a wide angle lens may be provided on the camera, or the camera is angled such that its imaging axis is tilted. With the non-linear scaling capabilities of many video processors including the processor 18, this known geometric distortion could be compensated for.

With more specificity, the AVDD 12 may execute a video processing block that has "warping" capability according to principles known in the art. Recognizing this, some embodiments may assume a default distance at which most viewers typically prefer to stand in front of a mirror and then assume that the viewer in the image from the camera 50 is located at this default distance from the AVDD. Since the default distance is constant, for a given camera angle, the distortion of the image due to the camera angle can be compensated for by the video processing block of the AVDD. Distortion from a wide angle lens can also be compensated for.

Additionally, in some embodiments the AVDD may cycle through an ambient light sequence to allow the viewer to view himself under multiple ambient light conditions as established by the settings for the white boundary regions described above. For example, morning lighting conditions may be emulated by appropriately establishing the color temperature and/or other display settings of the white boundary regions for a first period, e.g., ten seconds, and then the settings can be changed to, e.g., office settings for a similar period, then an outdoor daytime ambient light setting, then an evening ambient light setting, and then a restaurant ambient light setting.

While the particular MAKEUP TV is herein shown and described in detail, it is to be understood that the subject matter which is encompassed by the present invention is limited only by the claims.

What is claimed is:

1. Audio video display device (AVDD) comprising:
at least one processor;
at least one computer readable storage medium with instructions executable by the processor to:
receive from a camera an image of a viewer of a display;
present the image of the viewer in a picture region of the display;
present a white background image and no other images in at least one border region adjacent the picture region to illuminate the viewer; and
cycle through an ambient light sequence for only the border region such that at least a first lighting condition is emulated by maintaining at least a first color temperature setting of the border region for at least a first period of at least a threshold period and at least a second lighting condition is emulated by maintaining at least a second color temperature setting of the border region for at least a second period of at least the threshold period to allow a viewer to view himself under multiple ambient light conditions as established by respective color temperature settings for the border region.

2. The AVDD of claim 1, wherein the instructions when executed by the processor configure the processor to establish first and second border regions straddling the picture region, each border region presenting a white background image and no other images.

3. The AVDD of claim 2, wherein the border regions are adjacent left and right sides of the picture region.

4. The AVDD of claim 2, wherein the border regions are adjacent top and bottom sides of the picture region.

5. The AVDD of claim 1, wherein the white background image has a predetermined color temperature.

6. The AVDD of claim 1, wherein the white background image has a predetermined brightness.

7. The AVDD of claim 5, wherein the instructions when executed by the processor configure the processor to cause the display to present a user interface operable by a viewer to change the brightness of the white background image.

8. Method comprising:
imaging a viewer of an audio video display device (AVDD) to establish an image;
presenting the image on the AVDD in real time as the viewer looks at the AVDD;
presenting an all-white background image on the display simultaneously with the image of the viewer to illuminate the viewer; and
cycling through an ambient light sequence for only a border region on the AVDD, the border region presenting the all-white background, such that at least a first lighting condition is emulated by maintaining at least a first color temperature setting of the border region for at least a first period of at least a threshold period and at least a second lighting condition is emulated by maintaining at least a second color temperature setting of the border region for at least a second period of at least the threshold period to allow a viewer to view himself under multiple ambient light conditions as established by respective color temperature settings for the border region.

9. The method of claim 8, comprising establishing first and second border regions straddling the picture region, each border region presenting the all-white background image and no other images.

10. The method of claim 9, wherein the border regions are adjacent left and right sides of the picture region and/or are adjacent top and bottom sides of the picture region.

11. The method claim 8, comprising presenting the all-white background image with a predetermined color temperature and/or with a predetermined brightness.

12. The method of claim 11, comprising presenting a user interface operable by a viewer to change the color temperature of the all-white background image and/or to change the brightness of the all-white background image.

13. A device, comprising:
at least one computer memory that is not transitory signal and that includes instructions executable by at least one processor to configure the processor for:
receiving an image of a viewer of a display from a camera,
presenting the image on the display,
controlling the display to cause the display to enter a makeup mode in which the camera images a viewer of the display and the viewer's image is presented on the display,
juxtaposing with the image an all-white background image in a border region, and
cycling through an ambient light sequence for only the border region such that at least a first lighting condition is emulated by maintaining at least a first color temperature setting of the border region for at least a first period of at least a threshold period and at least a second lighting condition is emulated by maintaining at least a second color temperature setting of the border region for at least a second period of at least the threshold period to allow a viewer to view himself under multiple ambient light conditions as established by respective color temperature settings for the border region.

14. The device of claim 13, wherein the instructions when executed by the processor configure the processor to establish first and second border regions straddling a picture region in which the image is presented, each border region presenting the all-white background image and no other images.

15. The device of claim 14, wherein the border regions are adjacent left and right sides of the picture region.

16. A device, comprising:
at least one computer memory that is not a transitory signal and that includes instructions executable by at least one processor to configure the processor to:
receive an image of a viewer of a display from a camera, present the image on the display,
control the display to cause the display to enter a makeup mode in which the camera images a viewer of the display and the viewer's image is presented on the display,
juxtapose with the image an all-white background image;
establish first and second border regions straddling a picture region in which the image is presented, each border region presenting the all-white background image and no other images; and
cycle through an ambient light sequence for only the border region such that at least a first lighting condition is emulated by maintaining at least a first color temperature setting of the border region for at least a first period in excess of two seconds and at least a second lighting condition is emulated by maintaining at least a second color temperature setting of the border region for at least a second period in excess of two seconds to allow a viewer to view himself under multiple ambient light conditions as established by respective color temperature settings for the border region.

17. The device of claim 13, wherein the instructions when executed by the processor configure the processor to cause the display to present a user interface operable by a viewer to change the brightness of the all-white background image.

18. The device of claim 13, wherein the instructions when executed by the processor configure a processor to execute a video processing block and provides a default distance to the video processing block and a camera angle to the video processing block representing an angle of the camera relative to a predetermined line, the processor executing the video processing block to compensate for distortion in an image from the camera.

19. The method of claim 8, comprising causing the display to present a use interface operable by a viewer to change the color temperature of the ail-white background image.

20. The device of claim 13, wherein the instructions are executable for causing the display to present a user interface operable by a viewer to change the color temperature of the ail-white background image.

* * * * *